US006646249B2

(12) United States Patent
Bird

(10) Patent No.: US 6,646,249 B2
(45) Date of Patent: Nov. 11, 2003

(54) IMAGE SENSOR

(75) Inventor: Neil C. Bird, Horsham (GB)

(73) Assignee: Koninklijke Philips Electronics N.V., Eindhoven (NL)

(*) Notice: Subject to any disclaimer, the term of this patent is extended or adjusted under 35 U.S.C. 154(b) by 48 days.

(21) Appl. No.: 10/144,827

(22) Filed: Oct. 25, 2001

(65) Prior Publication Data
US 2002/0134916 A1 Sep. 26, 2002

(30) Foreign Application Priority Data
Oct. 26, 2000 (GB) ............................................. 0026205

(51) Int. Cl.[7] .............................................. H01L 27/00
(52) U.S. Cl. ..................... 250/208.1; 348/294; 348/308
(58) Field of Search ................................. 348/207, 241, 348/294, 307–309, 311, 229, 281, 283, 300, 302; 250/370.09, 208.1, 214 R, 214.1; 257/230, 233, 89, 443–445; 438/16; 345/147, 204; 382/124; 359/55, 68, 54, 61, 58; 340/805; 358/482–483; 357/24

(56) References Cited

U.S. PATENT DOCUMENTS 5,134,489 A 7/1992 Sauer ................... 358/213.26
5,721,422 A * 2/1998 Bird ........................ 250/208.1
5,841,126 A * 11/1998 Fossum et al. .......... 250/208.1

* cited by examiner

Primary Examiner—David Porta
Assistant Examiner—Patrick J. Lee
(74) Attorney, Agent, or Firm—Eric M. Bram

(57) ABSTRACT

An image sensor comprises rows and columns of pixels. Each pixel comprises an image sensing element and a switching device. The switching device enables a signal of the image sensing element to be provided to the associated column conductor. The switching device has two inputs—a first input defined by the row conductor, and a second input. Two adjacent columns of pixels are associated with each column conductor, and the two columns of pixels between adjacent column conductors are associated with a respective shared control line providing the second input. The switch arrangement with two inputs enables individual pixels to be isolated. The sharing of control lines between pairs of columns of pixels means that each pixel requires the same number of connections as in a conventional array with only a single switch control input.

19 Claims, 6 Drawing Sheets

IMAGE SENSOR

This invention relates to an image sensor, and particularly to a pixel design for such an image sensor. Particularly, but not exclusively, the invention concerns image sensor arrays based on thin film transistor (TFT)-photodiode technology.

Optical image sensors typically comprise a pixel array arranged in rows and columns, with row driving circuitry and column reading circuitry being used to address the array of pixels. Typically, the row and column circuits are provided on a separate substrate to the pixel array, so that interconnections must be provided between each row and the row driver circuit and between each column and the column reading circuit. It is known to introduce multiplexer circuits onto the pixel substrate to enable the number of interconnections to be reduced.

Sensors employing TFT-photodiode pixel circuits have been known for some time, and the driving force behind their development has been, and continues to be, their use in medical diagnostic imaging applications. More recently, interest in optical-based fingerprint sensors has increased. Work has initially been based on diode-diode sensor arrays, but now attention is turning to TFT/photodiode technology because of the lower power consumption, faster read-out and higher multiplexer ratios that can be achieved.

FIG. 1 shows a typical structure of a column multiplexer circuit 10 connected to a TFT/photodiode image sensor array 20. Only a single row in the array 20 is illustrated for simplicity, associated with row conductor 22. Each pixel in the row comprises a TFT 24 and a photodiode 26 connected in series between a common potential 28 and a respective column conductor 30. A signal on the row conductor 22 turns on the TFTs 24 of each pixel in the row, which allows the photocurrent produced in the photodiode to flow to the respective column conductor 30 to be read by a charge sensitive amplifier arrangement 40.

A multiplexer switch 31 in the form of a TFT is connected between each column conductor 30 and the amplifier arrangement 40. The switches 31 are arranged in groups, with each switch 31 in a group being independently controlled by control lines A, B, C, D. These control lines A to D define four multiplexer channels A to D. Each group is provided with an associated charge measurement device 40. However, different groups share the control lines. The arrangement shown provides a 4:1 multiplexing function, and requires four additional control lines A to D.

After the array has been exposed to light, signal charges are stored on the capacitances of the photodiodes. At this point, the array can be read out, and this is done by addressing each row in turn by applying a positive pulse to the appropriate row conductor. In an array without a column multiplexer, each column is connected to its own charge-sensitive amplifier, and when the pixel TFTs 24 are turned on, the signal charge from each pixel flows down the column 30 to the respective charge-sensitive amplifier.

However, in an array with a column multiplexer, the situation is more complicated. Consider the situation when the columns connected to multiplexer channel A are to be read out. This is arranged by turning on the multiplexer TFTs connected to control line A, and ensuring that all other multiplexer TFTs are off. When the row pulse is applied, signal charge from the pixels in the columns associated with multiplexer channel A will flow down the column via the multiplexer switch 31 to the respective charge-sensitive amplifier 40. However, at the same time, the other pixel TFTs 24 will also have been turned on, and signal charge from the photodiodes in those pixels will be transferred to the column capacitance. Hence, the act of reading multiplexer channel A has caused the signal charge from the other pixels to have been lost to the column capacitance.

If a static image is being recorded, for example a fingerprint, the lost charge can be re-created by using multiple exposures. In such a scheme, multiplexer switches A would be turned on, and all rows in the array would be addressed in sequence, thereby reading out charge from all of the pixels connected to columns associated with multiplexer channel A. When this is complete, the array is re-exposed and column multiplexer switches 31 for channel B are turned on. The rows are once again addressed in sequence so that pixel charges from the pixels associated with channel B can be read out. This is repeated for multiplexer channels C and D. While this provides a solution to the charge loss, it suffers from two disadvantages. Firstly, the multiple exposure and read-out lead to a longer image acquisition process which, especially for the fingerprint sensor, is undesirable. The use of multiple exposures is also not appropriate for non-static images, for example in the field of medical diagnostic imaging. Secondly, the data from the array emerges in a column-based sequence. In principle this need not be an issue, but in practice could require the development of bespoke image acquisition and processing software.

To avoid the need for multiple imaging, it is possible for the 'lost' pixel charge to be recovered by transferring the charge from the column capacitances. When reading out multiplexer channels B, C and D by turning on the respective multiplexer switches 31, the column capacitance could be connected to the charge-sensitive amplifier. A number of timing schemes can be devised for such a read-out scheme, but all of them suffer the drawback that the charge is stored on the column capacitance for a period. Further, this period is not the same for all multiplexer channels. The main concern with this type of read-out scheme is the effect of leakage currents from all of the pixels in each column.

A further alternative is to use a complete analogue line store (array of sample and hold circuits) as part of the column multiplexer circuit. With such a circuit in place, the signal charge from the pixels in a given row can be transferred to the line store when the row is addressed. Once this is complete, the charge can be transferred to the charge-sensitive amplifiers via the column multiplexer switches with a timing scheme that is most appropriate for the application. Again, there are several possible implementations, but these basically divide into two types. The first uses a simple switch/capacitor as the sample-and-hold (S/H) circuit, and the second employs a high-gain buffer amplifier as part of the S/H circuit. Both variants have drawbacks: in the first there is charge-sharing between the photodiode capacitor and the column parasitic capacitance; in the second, aside from the added complexity, the issue is the difficulty of implementing a high gain buffer using the same device technology as the pixel TFTs, for example n-channel amorphous silicon technology.

There is a need for an alternative approach which allows column multiplexing to be used with a single exposure image sensor and which is simple to implement. The multiplexing circuitry also needs to be readily implementable using the same technology as the devices of the image sensor pixel, for example n-channel amorphous silicon devices.

U.S. Pat. No. 5,134,489 discloses an image sensor comprising rows and columns of image sensing pixels, each row of pixels being associated with a respective row conductor, and each column of pixels being associated with a respective column conductor, each pixel comprising an image sensing element and a switching device, the switching device enabling a signal of the image sensing element to be provided to the respective column conductor, wherein the switching device is controlled by two inputs, a first input defined by the row conductor, and a second input.

The use of two inputs to the switching device enables an individual pixel within a row, or a group of pixels within a row, to be addressed. In other words, the row address pulse does not result in transfer of charge from the image sensing element of all pixels in the row. The second input is in practice associated with a columns of pixels, so that the two switch inputs can define a unique pixel in the array. A more complicated switching device is required, implemented as two series-connected TFTs in U.S. Pat. No. 5,134,489. This approach also increases the number of control lines for each pixel, which in turn reduces the area of the pixel available for the image sensing element. This reduces the sensitivity of the image sensor device.

According to the invention, two adjacent columns of pixels are associated with each column conductor, the two adjacent columns of pixels being located on opposite sides of the column conductor, the column conductors thereby having a pitch of twice the pitch of the pixel columns, and the two columns of pixels between adjacent column conductors are associated with a respective control line defining the second input.

In this way, a column conductor is shared between two columns of pixels, and the additional control line which provides the second input to the switch is also shared between two columns of pixels. This means that each pixel requires the same number of connections as in a conventional array with the row conductor defining the single switch control line. However, the shared column conductors and shared control lines are staggered, so although the control line addresses two columns of pixels, these are associated with different column conductors, so that the signals may be read separately.

Preferably, therefore, each column conductor is provided with a routing device which is selectively operable to route the signal from the column conductor to a first or a second signal measurement device. The two measurement devices enable the signals from the two column conductors associated with each control line to be read simultaneously.

The shared control line may provide a control signal for the two routing devices of the two columns which are associated with the shared control line, the control signal enabling one of the routing devices to route to the first signal measurement device and the other routing device to route to the second signal measurement device. Thus, the control inputs for the pixels are also used to control the supply of signals to the two measurement devices.

Each routing device may comprise first and second transistors, the first transistor being connected between the column conductor and the first signal measurement device, and the second transistor being connected between the column conductor and the second signal measurement device. These transistors preferably comprise amorphous silicon thin film transistors, and the switching device of each pixel also comprises one or more such transistors, so that the routing devices can readily be integrated with the pixel array.

Each pixel may comprise two series-connected transistors (defining the switching device) and the image sensing element, coupled between the column conductor and a common electrode.

One of the two series-connected transistors of one pixel may also form one of the two series-connected transistors of an adjacent pixel in the same column. Thus, the amount of additional pixel circuitry required can be reduced.

Examples of the invention will now be described in detail with reference to the accompanying drawings, in which.

As described above, it has been proposed to use a pixel configuration in which the pixel switch has two inputs, to enable each pixel to be addressed uniquely. The invention requires such a pixel design, which will now be described in greater detail with reference to FIG. 2.

Figure 1:
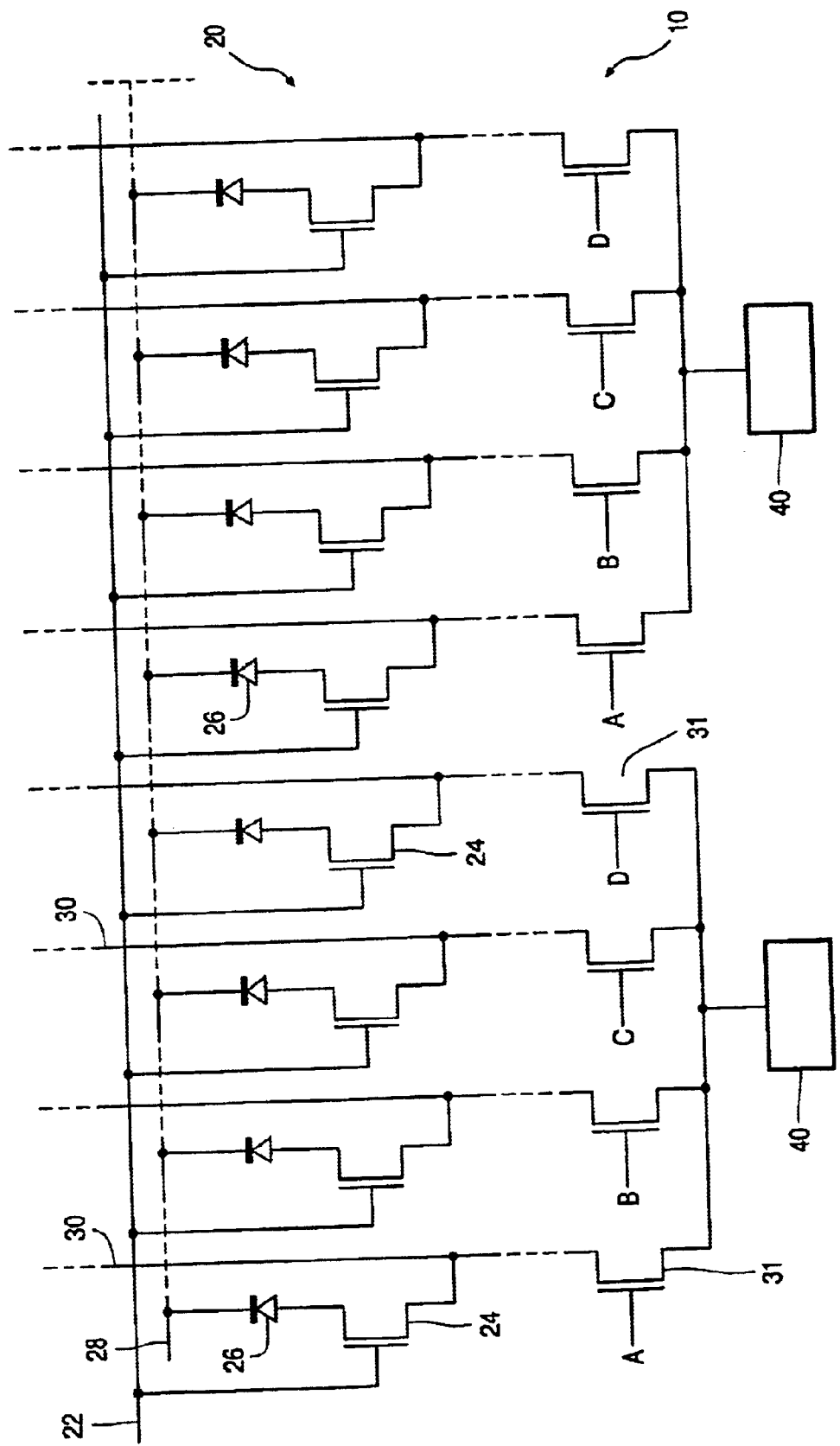
FIG. 1 shows a known pixel configuration with column multiplexer circuitry.
Figure 2:
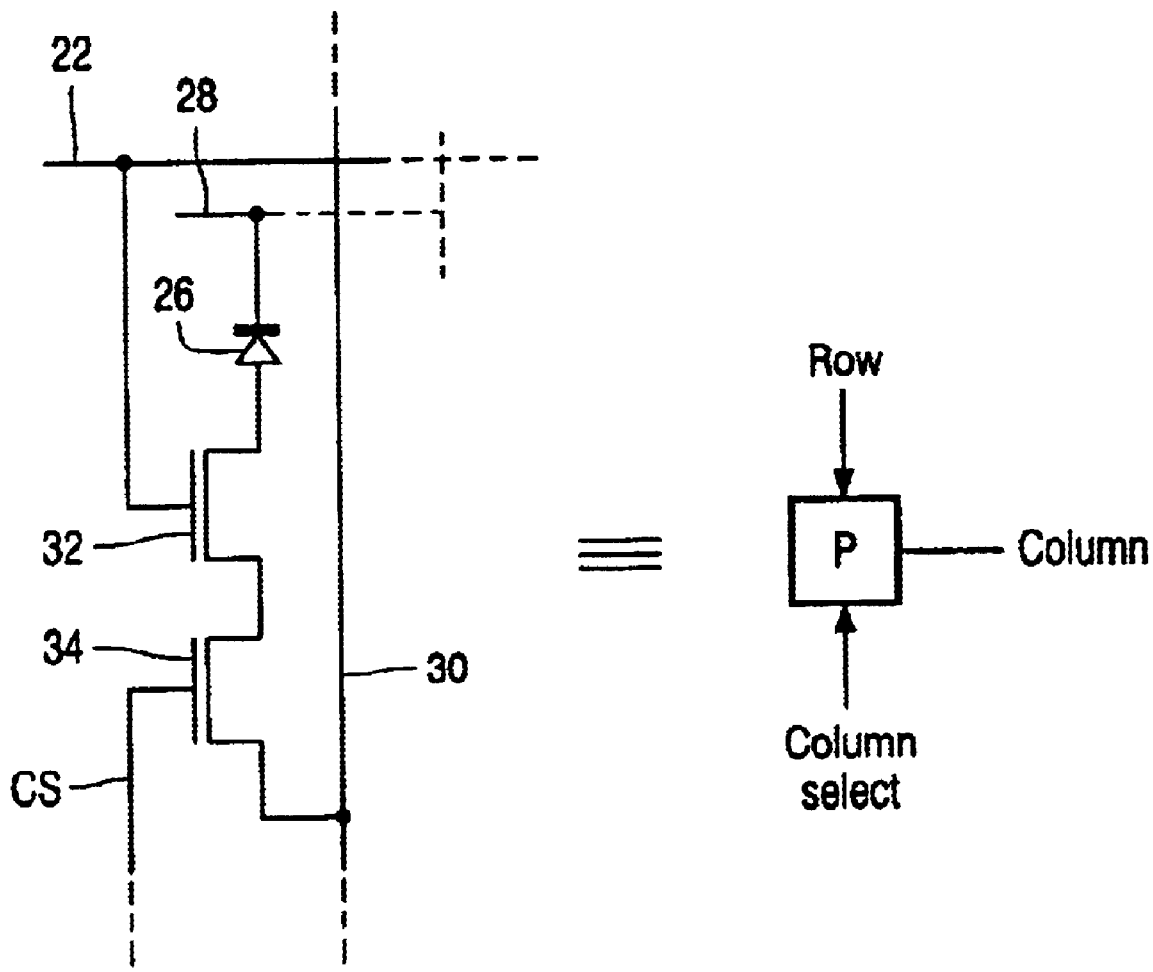
FIG. 2 shows a modified pixel design enabling the pixel to implement a multiplexing function.

The single TFT 24 of FIG. 1 has been replaced by two TFTs 32, 34 in series (although a TFT with two gates could alternatively be used). The first of the gates is connected to the row electrode 22 as in the standard TFT/photodiode pixel. The second gate, referred to as the Column Select (CS) input, is a further control input to the pixel which determines whether the pixel is to be read out or not. Since this control input CS is associated with columns of pixels, the two gate signals can together select each pixel independently. Since the two TFTs 32, 34 are connected in series, the pixel can only be read out when both of the TFTs are turned on, i.e. when both the row and column select inputs are positive. FIG. 2 also shows a schematic representation of the pixel layout P, which will be used below.

Figure 3:
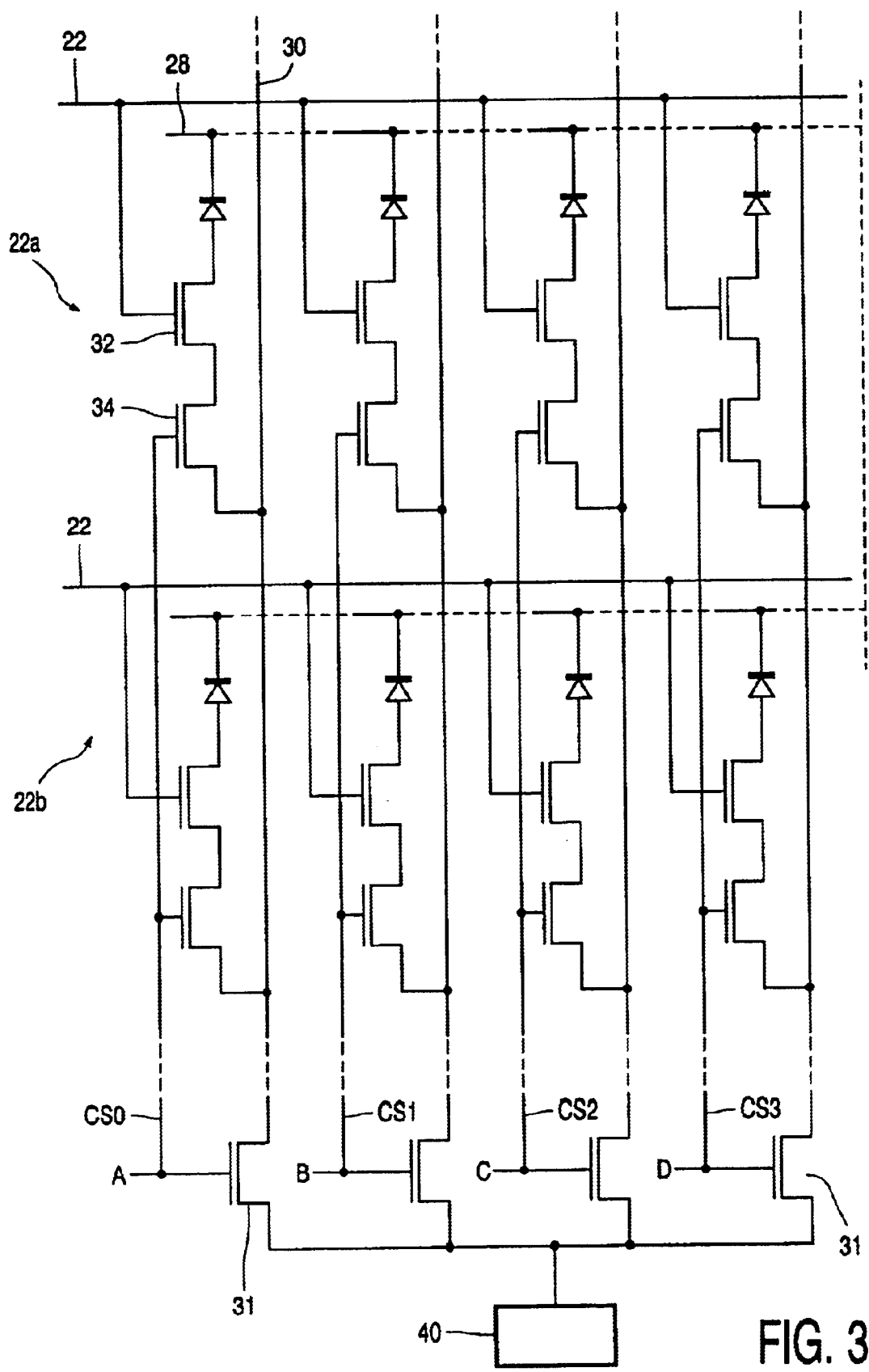
FIG. 3 shows a pixel configuration and multiplexer design using the pixel design of FIG. 2.

FIG. 3 shows how the revised pixel circuit can be used with a simple column multiplexer circuit to provide a multiplexing function that requires only one exposure per frame. For simplicity, FIG. 3 shows two rows 22a, 22b of an array, each row comprising a group of four pixels connected to a 4:1 column multiplexer block. In a complete array there will be many of these groups, each provided with an associated charge sensitive amplifier 40. The TFTs 31 at the base of each column are now optional because the multiplexing function is carried out at the pixel level. The control lines A to D again define four multiplexer channels A to D, but these control lines also define the column select signals CS0 to CS3.

Immediately after exposure, pixel charge is stored on the capacitance of the photodiodes, and the array is ready for read out. The array is addressed row by row as would the case when there is no column multiplexer. Addressing and read out of the signal charge from a given row takes place in four stages (for a 4:1 column multiplexer). First, the pixels connected to the A columns are read out, followed by the pixels connected to the B columns, and so on. Read out of the pixels connected to the A columns is achieved by driving input A positive and applying a positive pulse to the appropriate row electrode. Driving input A positive turns on the (optional) multiplexer TFT 31 as well as providing the positive column select signal CS0 for turning on second transistor 34 in the pixels of that column. In this way, the pixel charges from the A pixels in the selected row are transferred to the respective charge-sensitive amplifiers 40. No other charge movement takes place, because for the other pixels in the selected row, the column select input CS1 to CS3 is not positive, and this prevents charge being transferred from the photodiode capacitance. This process is repeated for the B, C and D columns. Therefore in order to read all pixels in the row, four positive pulses need to be applied to the row electrode (one for each multiplexer channel).

As mentioned above, the switches 31 can be omitted from the circuit. However, the capacitive loading at the input of the charge-sensitive amplifier 40 is made up from the total parasitic capacitance from all four columns. In some applications, particularly those where low noise is important, the capacitive loading should be kept to minimum (because capacitance at this point effectively amplifies the noise of the charge-sensitive amplifier input transistors). If the TFTs 31 are incorporated in the circuit, then the capacitance of columns which are not being accessed is isolated from the amplifier input. In the case of a 4:1 multiplexer, the input capacitance will be then reduced by a factor 4.

A key disadvantage of the circuit in FIG. 3 is the number of connections to each pixel in the array. Each pixel requires four connections: row electrode 22, column electrode 30, common electrode 28 and the column select electrode CS. This increase in the number of electrodes will reduce the amount of area within each pixel that is devoted to the photodiode, which ideally should be maximised to provide the largest possible signal.

Figure 4:
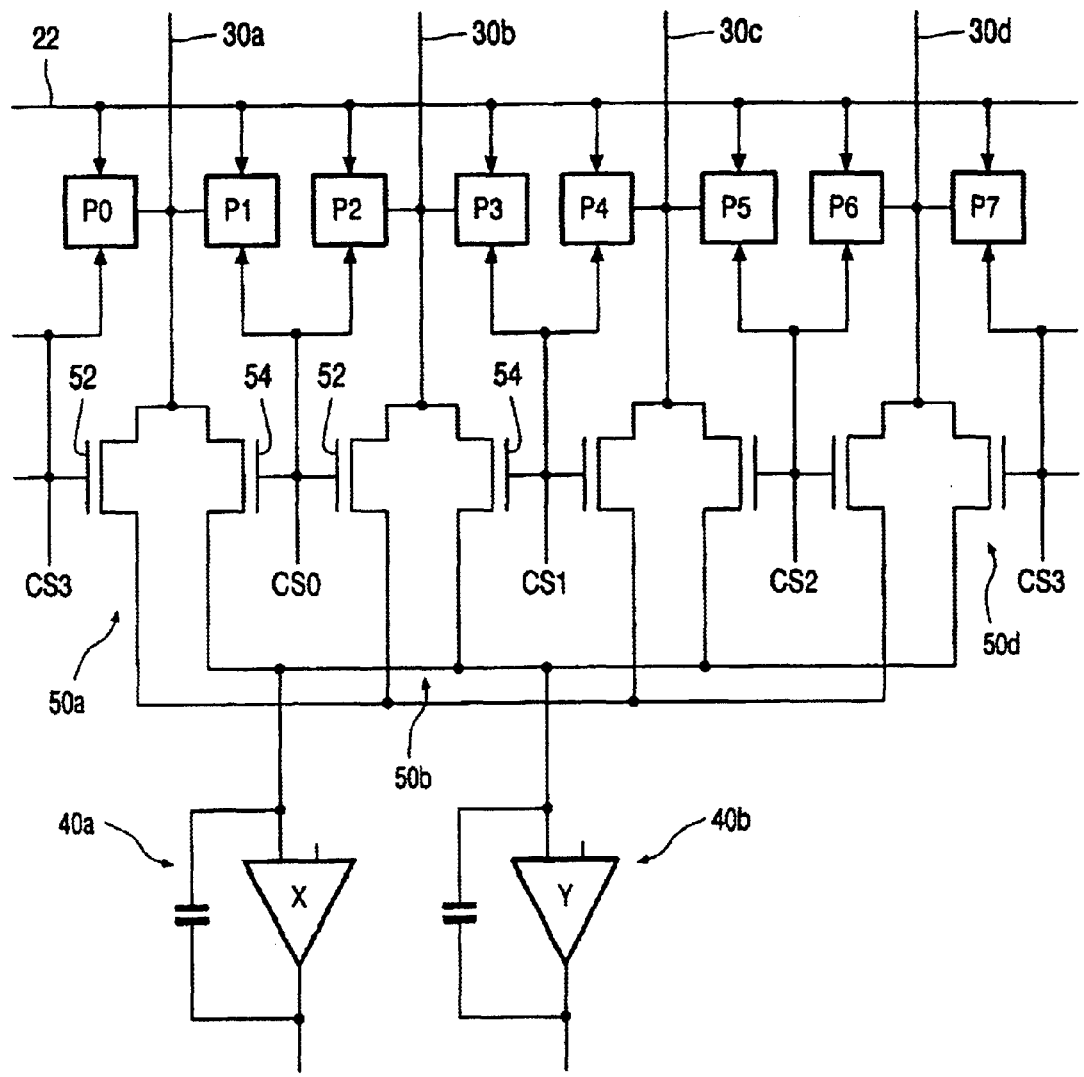
FIG. 4 shows a pixel configuration and multiplexer design according to the invention also using the pixel design of FIG. 2.

FIG. 4 shows the implementation according to the invention. In FIG. 4, each pixel P has been represented by the schematic block, using the notation of FIG. 2. A section of an array comprising 8 pixels P0 to P7 is shown, multiplexed into two charge-sensitive amplifiers 40a, 40b. As before, the multiplex ratio is 4:1.

In this arrangement, two adjacent columns of pixels are associated with each column conductor. Thus, the columns having pixels P0 and P1 are associated with column conductor 30a, the columns having pixels P2 and P3 are associated with column conductor 30b, and so on. In each case, the two adjacent columns are located on opposite sides of the column conductor 30. This means the pitch of the column conductors 30 is twice the pitch of the columns of pixels, with pairs of columns sharing a column conductor 30.

Similarly, the column select control line CS is also shared between an adjacent pair of columns. In particular, the two columns of pixels between adjacent column conductors are associated with a respective shared column select control line CS. Thus, the columns including pixels P1 and P2 share control line CS0, and these columns of pixels are located between column conductors 30a and 30b. The columns having pixels P3 and P4 share the control line CS1, and these columns of pixels are located between column conductors 30b and 30c.

Although the column select control line CS no longer enables an individual pixel to be addressed, the two columns of pixels addressed by each control line CS are associated with different column conductors 30. This means that two pixels are addressed simultaneously, and the signals provided to the different column conductors 30 can be read simultaneously using the two amplifiers 40a, 40b.

To enable this, each column conductor is provided with a routing device 50 which enables the signal on the respective column conductor 30 to be routed to one or other of the two amplifiers 40a, 40b. Taking the routing device 50a as an example, it comprises two transistors 52, 54. The first transistor 52 is connected between the column conductor 30a and one of the amplifiers 40b, and the second transistor 54 is connected between the column conductor 30a and the other amplifier 40a.

The circuit is arranged such that the column select control lines CS also provide the switching signals for the routing devices 50. Thus, when one column select control signal is high it ensures that the two routing devices 50 of the associated columns route to different amplifiers. For example, assuming the column select control signal CS0 is high, this causes the signal on column conductor 30a to be provided to the charge sensitive amplifier 40a, and provides that the signal on the column conductor 30b is provided to the amplifier 40b. At this time the column select signals CS3 and CS1 are both low so that transistor 52 of routing device 50a is turned off, and transistor 54 of routing device 50b is also turned off.

As shown in the table at the base of FIG. 4, during a row pulse applied to the row conductor 22, the column select control lines are sequentially pulsed, and each column select control line results in two pixels from the row providing a signal to the two amplifiers 40a, 40b.

The transistors of the routing devices 50 may be implemented using the same device technology as the transistors of the pixels. In particular, all of the transistors of the array may be implemented as amorphous silicon thin film transistors.

The sharing of column conductors and the column select control lines means that each pixel effectively has the same number of electrodes as in a non-multiplexed array. Thus, on average, each row of pixels pixel is associated with one row conductor 22, each column of pixels is associated with one column conductor 30 or CS and each pixel has connection to the common electrode (not shown in FIG. 4).

Figure 5:
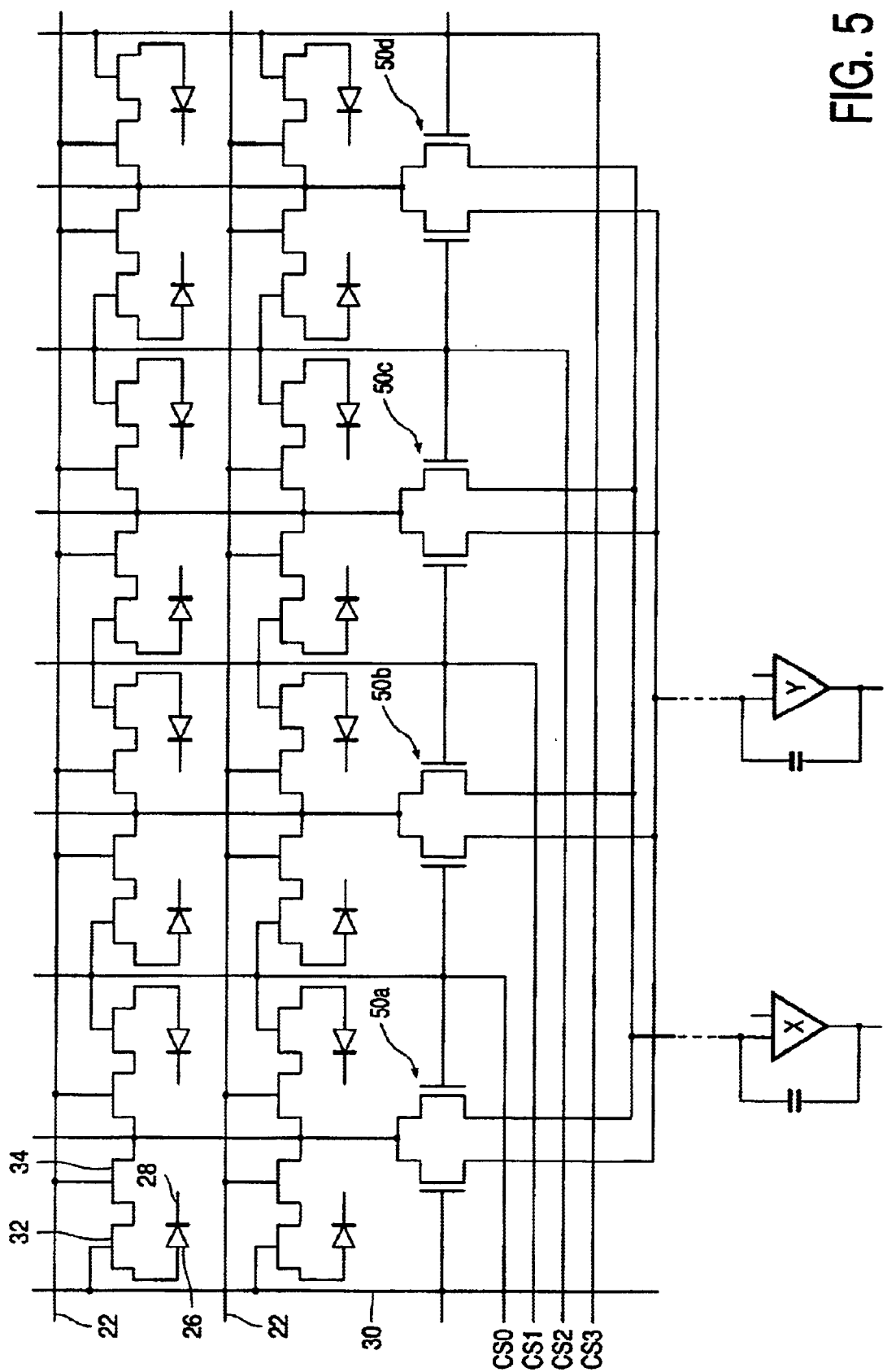
FIG. 5 shows the design of FIG. 4 in greater detail.

FIG. 5 shows in greater detail the components layout of the circuit of FIG. 4.

The invention enables the use of column multiplexer circuits with a single exposure sensor array, but without increasing substantially the pixel complexity or the number of connections required to each pixel.

Figure 6:
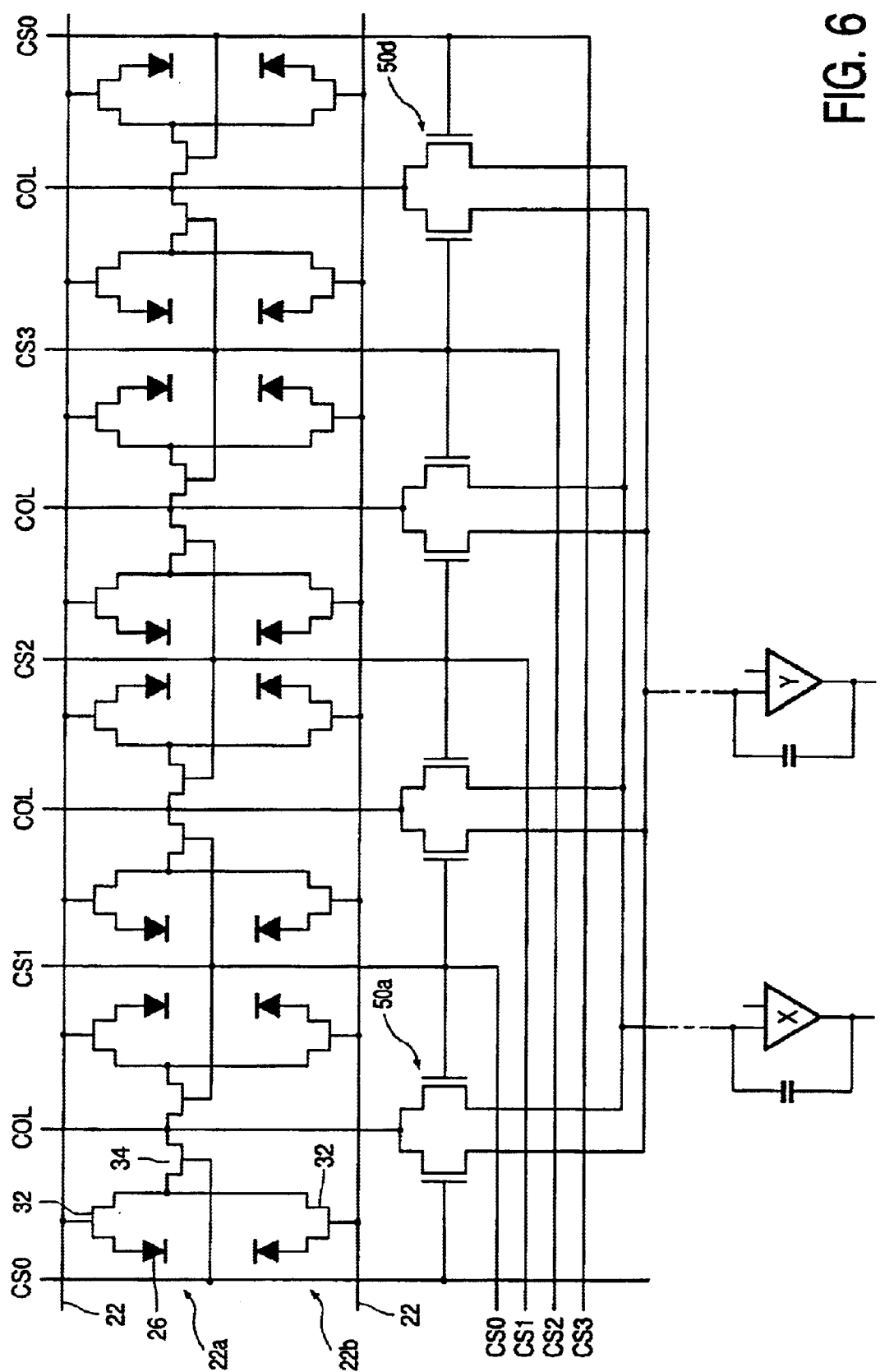
FIG. 6 shows a second embodiment of pixel configuration and multiplexer design according to the invention.

The pixel configuration described above does, however, require an additional transistor for each pixel. FIG. 6 shows a second embodiment of the invention in which, in addition to sharing control lines and column conductors, the second pixel 34 is also shared between adjacent pixels in the same column. Two rows of pixels 22a, 22b are shown in FIG. 6, with the second transistor 34 of each pixel being shared between the two rows. To enable this layout to be implemented in practice, the layout of each row is the mirror image of the layout of an adjacent row. For each pair of rows 22a, 22b the row conductors 22 will lie at the upper and lower boundaries of the pair of rows.

The layout shown in FIG. 6 is addressed in an identical manner to the addressing of the layout shown in FIGS. 4 and 5. Despite the shared transistor 34, the signal from only one image sensing element is transferred to the respective column conductor 30 at any one time, because only one of the transistors 32 is turned on at any point in time by the row address pulse.

As described above, the invention may be applied to medical diagnostic imaging. In this case, the image sensor is used to form an x-ray image detector. For this purpose, a radiation conversion layer is provided over the array of pixels for converting the incident x-ray signal into visible light for detection by the photodiode array.

The terminology "columns" and "rows" for an array is somewhat arbitrary, and the use of the terms row and column should merely be understood as representing a two-dimensional array of image sensing elements.

The processes involved in manufacturing an image sensor will be known to those skilled in the art. In particular, the invention can be implemented using standard photolithographic techniques, such as would be used to manufacture the conventional device of FIG. 1.

Various modifications will be apparent to those skilled in the art.

What is claimed is:

1. An image sensor comprising rows and columns of image sensing pixels, each row of pixels being associated with a respective row conductor, and each column of pixels being associated with a column conductor, each pixel comprising an image sensing element and a switching device, the switching device enabling a signal of the image sensing element to be provided to the associated column conductor, wherein the switching device is controlled by two inputs, a first input defined by the row conductor, and a second input, characterized in that two adjacent columns of pixels are associated with each column conductor, the two adjacent columns of pixels being located on opposite sides of the column conductor, the column conductors thereby having a pitch of twice the pitch of the pixel columns, and in that the two columns of pixels between adjacent column conductors are associated with a respective shared control line providing the second input.

2. An image sensor comprising rows and columns of image sensing pixels, each row of pixels being associated with a respective row conductor, and each column of pixels being associated with a column conductor, each pixel comprising an image sensing element and a switching device, the switching device enabling a signal of the image sensing element to be provided to the associated column conductor,
wherein the switching device is controlled by two inputs, a first input defined by the row conductor, and a second input,
wherein two adjacent columns of pixels are associated with each column conductor, the two adjacent columns of pixels being located on opposite sides of the column conductor, the column conductors thereby having a pitch of twice the pitch of the pixel columns,
wherein the two columns of pixels between adjacent column conductors are associated with a respective shared control line providing the second input, and
wherein each column conductor is provided with a routing device which is selectively operable to route the signal from the column conductor to a first or a second signal measurement device.

3. An image sensor as claimed in claim 2, wherein the shared control line provides a control signal for the two routing devices of the two columns which are associated with the shared control line, the control signal enabling one of the routing devices to route to the first signal measurement device and the other routing device to route to the second signal measurement device.

4. An image sensor as claimed in claim 3; wherein each routing device comprises first and second transistors, the first transistor being connected between the column conductor and the first signal measurement device, and the second transistor being connected between the column conductor and the second signal measurement device.

5. An image sensor as claimed in claim 4, wherein the first and second transistors comprise amorphous silicon thin film transistors, and wherein the switching device of each pixel also comprises one or more amorphous silicon thin film transistors.

6. An image sensor as claimed in claim 2, wherein each signal measurement device comprises a charge sensitive amplifier.

7. An image sensor as claimed in claim 1, wherein each pixel comprises two series-connected transistors and the image sensing element coupled between the column conductor and a common electrode, the two series-connected transistors defining the switching device.

8. An image sensor as claimed in claim 7, wherein the two inputs to the switching device are coupled to the gates of the two transistors.

9. An image sensor as claimed in claim 7, wherein one of the two series-connected transistors of one pixel also forms one of the two series-connected transistors of an adjacent pixel in the same column.

10. An image sensor as claimed in claim 1, wherein the image sensing element comprises a photodiode.

11. An image sensor as claimed in claim 2, wherein each pixel comprises two series-connected transistors and the image sensing element coupled between the column conductor and a common electrode, the two series-connected transistors defining the switching device.

12. An image sensor as claimed in claim 11, wherein the two inputs to the switching device are coupled to the gates of the two transistors.

13. An image sensor as claimed in claim 11, wherein one of the two series-connected transistors of one pixel also forms one of the two series-connected transistors of an adjacent pixel in the same column.

14. An image sensor as claimed in claim 2, wherein the image sensing element comprises a photodiode.

15. An image sensor comprising rows and columns of image sensing pixels, each row of pixels being associated with a respective row conductor, and each column of pixels being associated with a column conductor, each pixel comprising an image sensing element and a switching device, the switching device enabling a signal of the image sensing element to be provided to the associated column conductor, wherein:
the switching device is controlled by two inputs, the two inputs including a first input defined by the row conductor, and a second input;
two adjacent columns of pixels are associated with each column conductor, the two adjacent columns of pixels being located on opposite sides of the column conductor, the column conductors thereby having a pitch of twice the pitch of the pixel columns; and
the two columns of pixels between adjacent column conductors are associated with a respective shared control line providing the second input, every pixel of the two columns being associated with the same respective shared control line.

16. The image sensor of claim 1, wherein each pixel comprises two series-connected transistors and the image sensing element coupled between the column conductor and a common electrode, the two series-connected transistors defining the switching device.

17. The image sensor of claim 16, wherein the two inputs to the switching device are coupled to the gates of the two transistors.

18. The image sensor of claim 16, wherein one of the two series-connected transistors of one pixel also forms one of the two series-connected transistors of an adjacent pixel in the same column.

19. The image sensor of claim 15, wherein the image sensing element comprises a photodiode.

* * * * *